US008660750B2

(12) United States Patent
Savaresi et al.

(10) Patent No.: US 8,660,750 B2
(45) Date of Patent: *Feb. 25, 2014

(54) SYSTEM FOR ENHANCING CORNERING PERFORMANCE OF A VEHICLE EQUIPPED WITH A STABILITY CONTROL SYSTEM

(75) Inventors: Sergio M. Savaresi, Milan (IT); Matteo Corno, Milan (IT); Sebastian Campo, Turin (IT); Andrea Fortina, Turin (IT); Nicola Natali, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 454 days.

This patent is subject to a terminal disclaimer.

(21) Appl. No.: 12/868,345

(22) Filed: Aug. 25, 2010

(65) Prior Publication Data
US 2011/0054738 A1 Mar. 3, 2011

(30) Foreign Application Priority Data

Aug. 27, 2009 (EP) .................................... 09425332

(51) Int. Cl.
*A01B 69/00* (2006.01)
*G06F 7/70* (2006.01)
*B60T 8/24* (2006.01)

(52) U.S. Cl.
USPC .................................. 701/41; 701/70; 701/72

(58) Field of Classification Search
None
See application file for complete search history.

(56) References Cited

U.S. PATENT DOCUMENTS

| 5,842,754 | A | 12/1998 | Sano |
| 5,865,513 | A | 2/1999 | Inagaki et al. |
| 6,074,020 | A * | 6/2000 | Takahashi et al. ............ 303/146 |
| 2004/0176899 | A1 | 9/2004 | Hallowell |
| 2005/0080545 | A1* | 4/2005 | Takagi ........................... 701/70 |
| 2007/0005214 | A1 | 1/2007 | Villella |
| 2007/0050112 | A1* | 3/2007 | Kroehnert et al. .............. 701/41 |

FOREIGN PATENT DOCUMENTS

| DE | 103 28 685 | 1/2005 |
| DE | 3943860 | 9/2005 |
| EP | 1 522 475 | 4/2005 |
| EP | 1 695 894 | 8/2006 |
| GB | 2 308 167 | 6/1997 |
| WO | WO 02/090161 | 11/2002 |
| WO | WO 2004 048171 | 6/2004 |

* cited by examiner

*Primary Examiner* — Fahd Obeid
(74) *Attorney, Agent, or Firm* — Gottlieb, Rackman & Reisman, P.C.

(57) ABSTRACT

A system for controlling a vehicle having a brake assembly for exerting braking force on at least one wheel on the basis of a number of control parameters is provided. The system has a vehicle stability control system configured to generate the control parameters as a function of a control quantity associated with the intensity of the braking force to be exerted on the wheels; and a vehicle handling enhancement system configured to calculate, in the presence of cornering acceleration of the vehicle, a reference vehicle yaw rate on the basis of at least the longitudinal velocity of the vehicle and the steer angle of the vehicle, and to adjust the control quantity to zero the difference between the actual yaw rate and the reference vehicle yaw rate.

4 Claims, 4 Drawing Sheets

SYSTEM FOR ENHANCING CORNERING PERFORMANCE OF A VEHICLE EQUIPPED WITH A STABILITY CONTROL SYSTEM

The present invention relates to a system for enhancing the cornering performance of a vehicle, in particular an automobile, equipped with a stability control system.

BACKGROUND OF THE INVENTION

As is known, over the past few years, the automotive industry has become increasingly aware of the need to improve driving safety.

Accordingly, electronic vehicle stability control systems have been devised, such as the ESC (Electronic Stability Control) system, which intervenes when skidding, by adjusting output of the engine and/or differentially controlling braking of the vehicle wheels to automatically right the vehicle.

More specifically, the ESC system is designed to intervene in the event of sharp swerving and/or over- or understeering conditions caused by the driver mishandling the vehicle when cornering, to prevent the vehicle from skidding.

The control architecture of the ESC system is substantially based on a number of mathematical models representing the dynamic behaviour of the vehicle in different handling conditions by means of vehicle parameters and motion equations.

More specifically, the dynamic cornering behaviour of the vehicle in over- or understeering conditions is defined by a mathematical model substantially characterized by vehicle parameters related to the "mechanical structure", e.g. geometry and mass distribution, of the vehicle.

Though effective, the control architecture of the above stability control system does not allow the driver, in stable vehicle conditions, to enhance the cornering performance of the vehicle as desired to achieve a response, e.g. racing performance mode, other than that provided for by the stability control system.

In other words, in stable vehicle conditions, the above stability control system does not allow the driver to enhance vehicle performance, e.g. to achieve faster braking of the wheels in response to driver control.

SUMMARY OF THE INVENTION

It is an object of the present invention to provide a vehicle control system designed to enhance cornering performance of the vehicle, while at the same time maintaining the safety functions of the stability control system to meet the above requirements.

According to the present invention, there is provided a vehicle control system as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
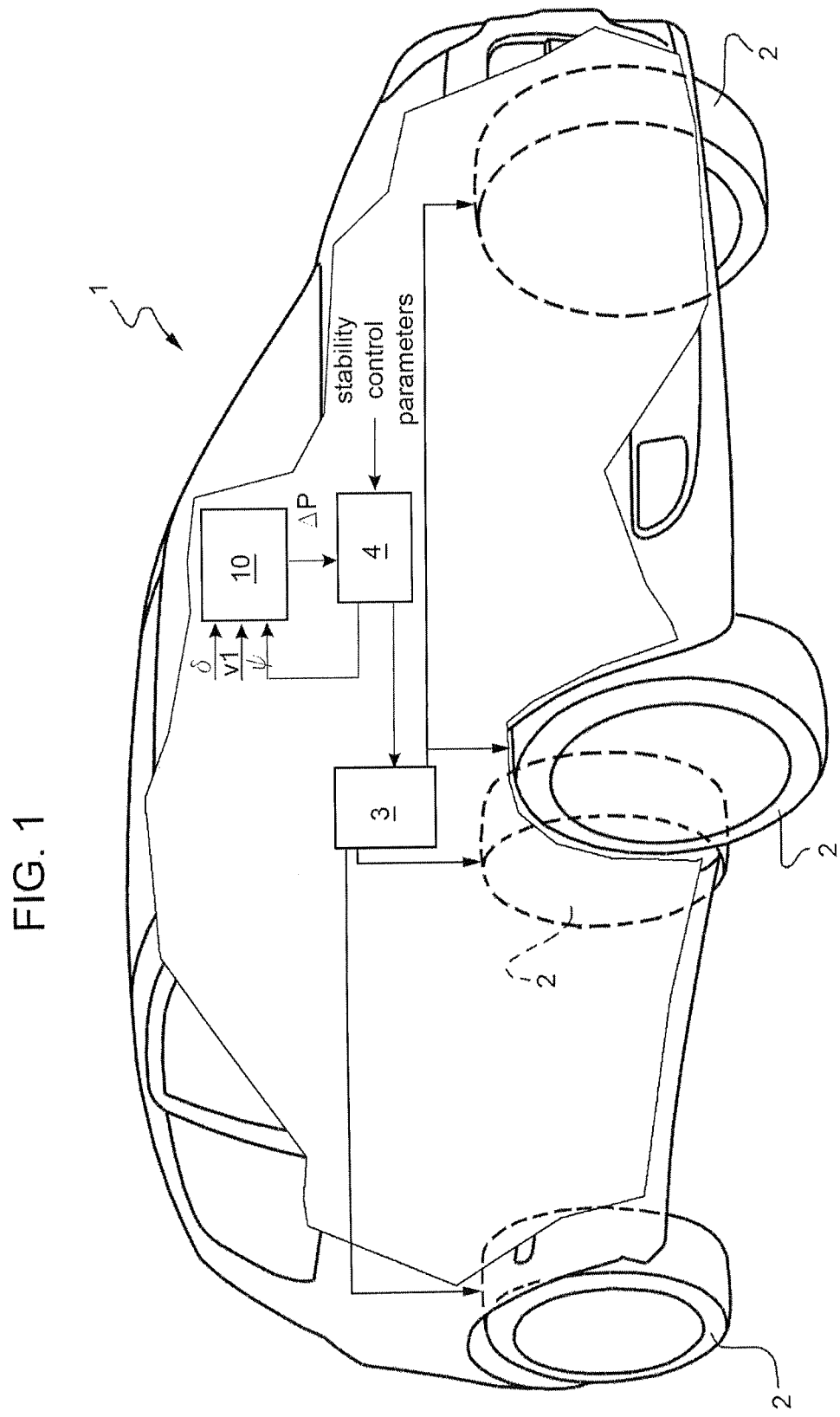
FIG. 1 shows a schematic of an automobile equipped with a vehicle control system in accordance with the teachings of the present invention.

Number 1 in FIG. 1 indicates as a whole a vehicle, in particular an automobile, comprising four supporting wheels 2; a brake assembly 3 in turn comprising brake calipers (not shown), each activatable selectively to brake a corresponding wheel 2 of vehicle 1; and a vehicle control system 4 which controls brake assembly 3 to coordinate braking of wheels 2 by the brake calipers of brake assembly 3.

Brake assembly 3 is a known device and, not being the object of the present invention, is not described in detail.

Vehicle control system 4 comprises a stability control system 7 configured to intervene, when skidding, by adjusting output of the engine and/or differentially regulating a parameter controlling the braking force on vehicle wheels 2, to automatically right vehicle 1.

More specifically, in the example shown, stability control system 7 preferably, though not necessarily, comprises an ESC (Electronic Stability Control) system, in turn comprising a regulating block 8 for controlling distribution of the braking forces on the vehicle wheels; and a processing block 9 for processing dynamic vehicle behaviour.

More specifically, regulating block 8 receives a number of known vehicle parameters, such as wheel speed, steering wheel angle, accelerator pedal position, yaw rate, lateral acceleration, longitudinal acceleration, etc; and a braking force regulating parameter differential or gradient, in particular a pressure gradient $\Delta P$, which, as explained in detail below, is related to the braking force to be applied to the brake calipers of brake assembly 3 when controlling braking of wheels 2.

More specifically, regulating block 8 is configured to process the vehicle parameters and pressure gradient $\Delta P$ to determine the parameters regulating the braking force, in particular the brake pressure Pi, associated with braking the rear wheel of vehicle 1 on the inside of the curve traveled by vehicle 1. Processing by regulating block 8 is known and not described in detail, except to state that is corresponds to the processing implemented by an ESC system.

Dynamic vehicle behaviour processing block 9 receives the brake pressure Pi associated with braking the rear wheel of vehicle 1, as well as the other brake pressures Pi, and supplies the measured yaw rate $\dot{\psi}$ of vehicle 1.

Vehicle control system 4 also comprises a vehicle handling enhancement system 10 designed to cooperate with stability control system 7 to allow the driver to "modify" the dynamic behaviour of vehicle 1 when cornering.

Vehicle handling enhancement system 10 is configured to calculate a reference yaw rate $\dot{\psi}_{REF}$ as a function of the dynamic behaviour of the vehicle when accelerating round a bend, and calculates the gradient of a braking force-related control parameter, in particular the pressure gradient $\Delta P$ to be supplied to stability control system 7, on the basis of the difference between reference yaw rate $\dot{\psi}_{REF}$ and the actual yaw rate $\dot{\psi}$.

More specifically, vehicle handling enhancement system 10 is configured to regulate pressure gradient $\Delta P$ to zero the difference between reference yaw rate $\dot{\psi}_{REF}$ and actual yaw rate $\dot{\psi}$.

Figure 2:
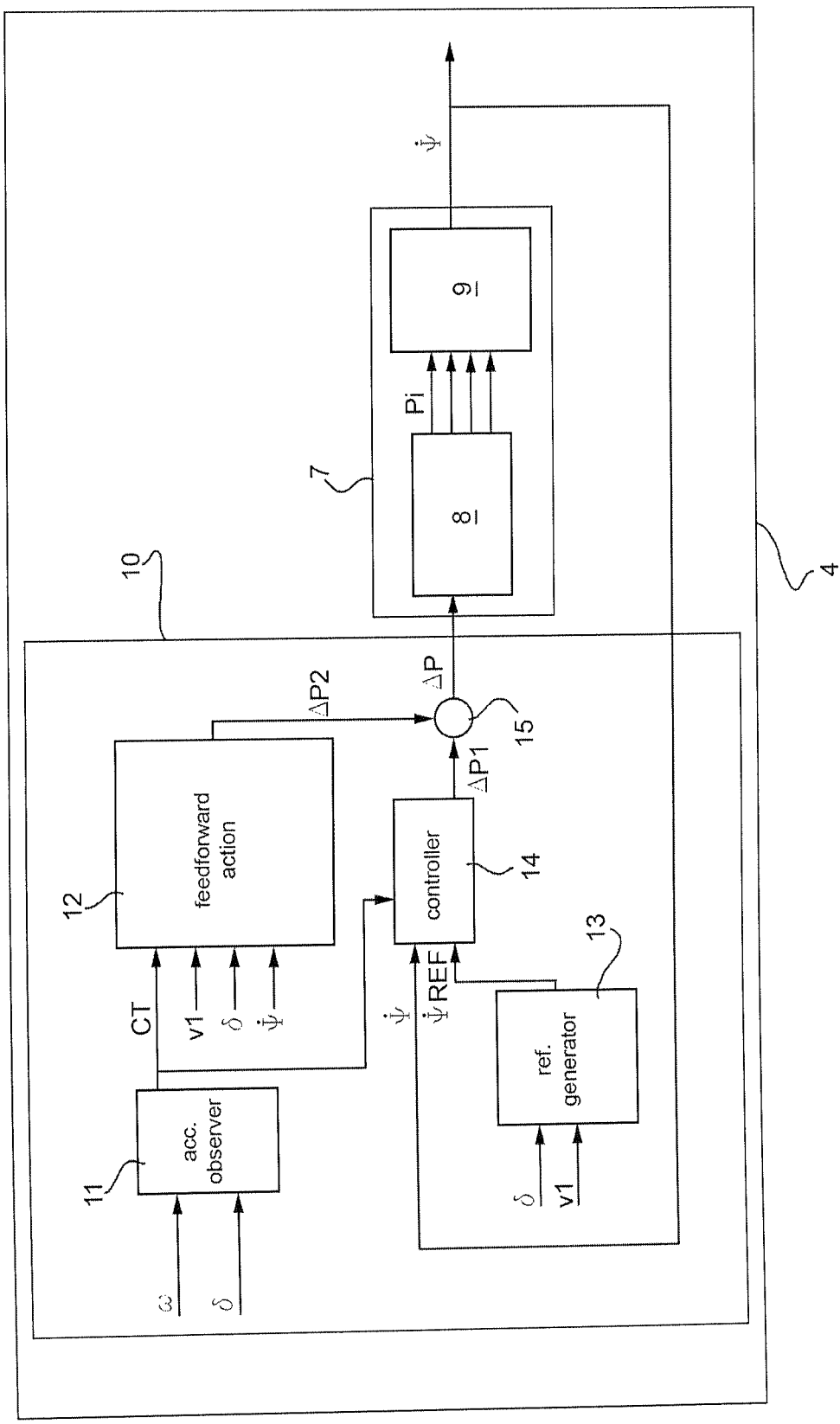
FIG. 2 shows a block diagram of the FIG. 1 vehicle control system.

With reference to FIG. 2, vehicle handling enhancement system 10 substantially comprises an observer block 11; an open-loop control block 12; a reference generating block 13; and a main controller 14.

More specifically, observer block 11 is configured to determine cornering acceleration of vehicle 1.

More specifically, observer block 11 receives the longitudinal velocity $v_1$ of the vehicle, the steer angle $\delta$ of the front wheels of the vehicle, and the operating speed $\omega$ of the vehicle accelerator pedal, and processes the received parameters to determine cornering acceleration of vehicle 1 and accordingly generate a trigger command CT.

Open-loop control block 12 is configured to generate a parameter gradient related to the braking action to be exerted on the wheels, and in particular a pressure gradient $\Delta P_1$ related to the brake pressure to be applied to the brake calipers of brake assembly 3.

More specifically, in the FIG. 2 example, open-loop control block 12 receives the trigger command CT generated by observer block 11, the longitudinal velocity $v_1$ of the vehicle, the yaw rate $\dot{\psi}$ measured by a sensor on vehicle 1, and steer angle $\delta$, and calculates a pressure gradient $\Delta P_1$ according to the equation:

$$\Delta P_1 = a \cdot v_1 + b \cdot \dot{\psi} + c \cdot \delta \qquad 1)$$

where a, b and c are predetermined parameters.

Reference generating block 13 is configured to calculate a reference yaw rate $\dot{\psi}_{REF}$ as a function of the dynamic behaviour of vehicle 1 when accelerating round a bend.

More specifically, in the FIG. 2 example, reference generating block 13 receives the longitudinal velocity $v_1$ and steer angle $\delta$ of vehicle 1, and processes them by means of a predetermined mathematical model to supply reference yaw rate $\dot{\psi}_{REF}$.

More specifically, reference generating block 13 determines reference yaw rate $\dot{\psi}_{REF}$ according to the equation:

$$\dot{\psi}_{REF} = \delta \frac{v_1}{(\tau s L + K_{US} v_1^2)} \qquad a)$$

where $\dot{\psi}_{REF}$ is the reference yaw rate; $K_{US}$ is an understeer coefficient; L is the vehicle wheelbase; and $\tau s$ is the steering ratio.

Main controller 14 receives trigger command CT, actual yaw rate $\dot{\psi}$ and reference yaw rate $\dot{\psi}_{REF}$, and generates, on receiving trigger command CT and as a function of the difference between actual yaw rate $\dot{\psi}$ and reference yaw rate $\dot{\psi}_{REF}$, a pressure gradient $\Delta P_2$ related to the brake pressure to be applied to the brake calipers of brake assembly 3.

More specifically, main controller 14 may preferably, though not necessarily, comprise a proportional-integral-derivative PID module configured to regulate pressure gradient $\Delta P_2$ to zero the difference between actual yaw rate $\dot{\psi}$ and reference yaw rate $\dot{\psi}_{REF}$.

Vehicle handling enhancement system 10 also comprises an adding module 15 which receives pressure gradient $\Delta P_1$ generated by open-loop control block 12, and pressure gradient $\Delta P_2$ generated by main controller 14, and supplies an overall pressure gradient $\Delta P = \Delta P_1 + \Delta P_2$ to stability control system 7.

Figure 3:
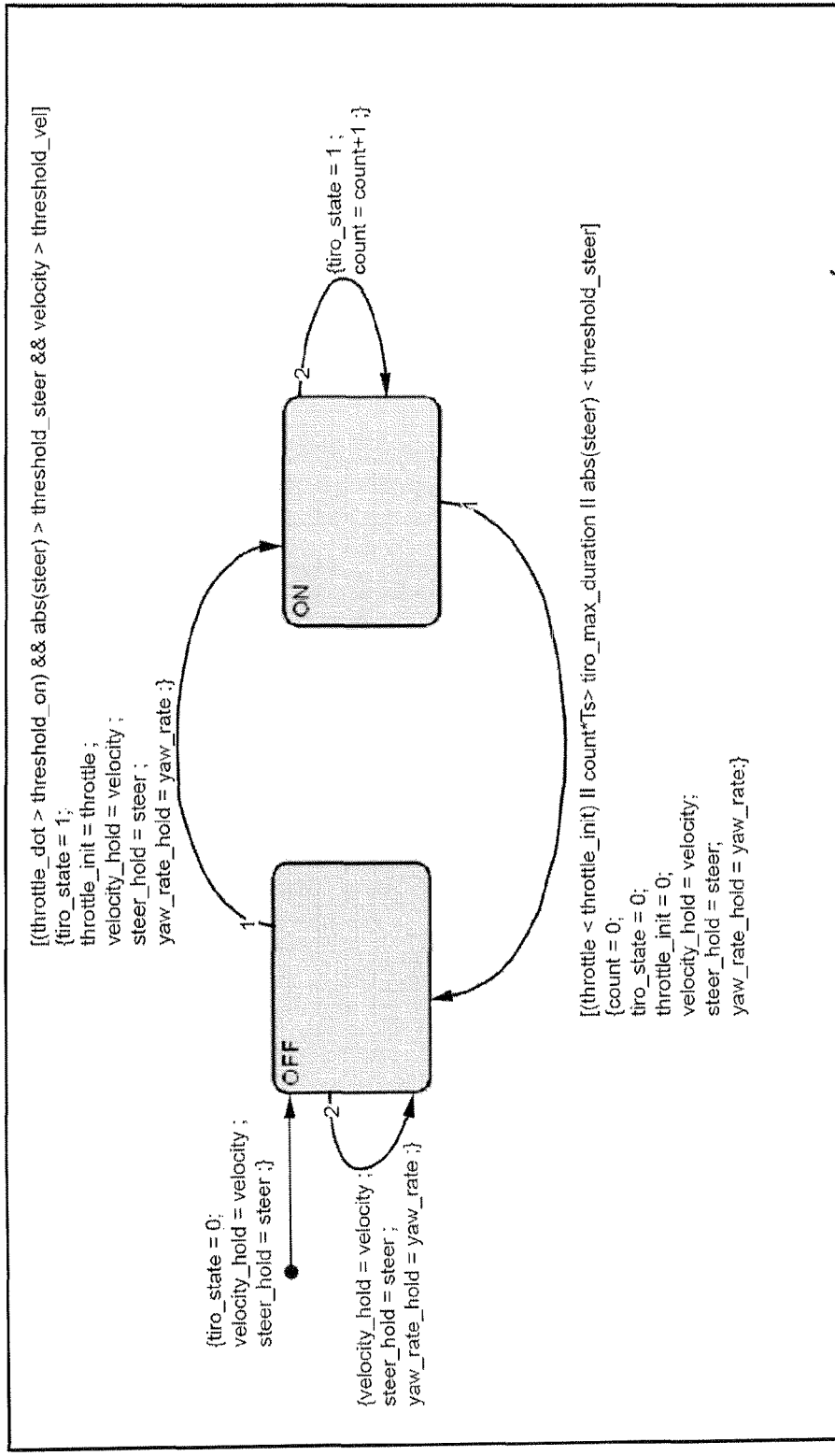
FIG. 3 shows a schematic of the state machine of the observer block forming part of the FIG. 1 vehicle control system.

With reference to FIG. 3, observer block 11, as stated, serves to determine cornering acceleration of vehicle 1, and to accordingly generate trigger command CT to activate main controller 14 and open-loop control block 12.

In the FIG. 3 example, observer block 11 comprises a state machine, which switches between two states: an OFF state when cornering acceleration of vehicle 1 does not occur, and an ON state when cornering acceleration of vehicle 1 does occur.

More specifically, observer block 11 is configured to determine cornering acceleration of the vehicle when the following three conditions occur simultaneously: steer angle $\delta$ exceeds a predetermined steer threshold $S\delta$; the operating speed $\omega$ of the vehicle accelerator pedal (not shown) exceeds a predetermined pedal operating speed threshold $S\omega$; and longitudinal vehicle velocity $v_1$ exceeds a predetermined velocity threshold $Sv_1$. When the above three conditions occur, observer block 11, if already ON, remains ON, and, if OFF, switches to ON.

Observer block 11 is also configured to determine no cornering acceleration of vehicle 1, when at least one of the following three conditions occurs: steer angle $\delta$ is below predetermined steer threshold $S\delta$; the operating speed $\omega$ of the vehicle accelerator pedal (not shown) is below predetermined threshold $S\omega$; longitudinal vehicle velocity $v_1$ is below predetermined threshold $Sv_1$. When at least one of the above conditions occurs, observer block 11, if already OFF, remains OFF, and, if ON, switches to OFF.

With reference to FIG. 3 showing an example embodiment of the state machine, observer block 11, when OFF, performs the following operations: assigns a first logic value to a state variable indicated tiro_state in the example and associated with the presence/absence of acceleration, e.g. tiro_state=0; assigns the measured longitudinal velocity $v_1$ to a variable indicated velocity_hold in the example and corresponding to the longitudinal vehicle velocity (velocity_hold=velocity=$v_1$); and assigns the measured steer angle to a variable indicated steer_hold in the example and corresponding to the steer angle (steer_hold=steer=$\delta$).

In the FIG. 3 example, the state machine of observer block 11 is configured to switch from OFF to ON when the following three conditions occur simultaneously:

1) throttle_dot>threshold_on
2) abs(steer)>threshold_steer
3) velocity>threshold_velocity More specifically, throttle_dot is the accelerator pedal operating speed $\omega$; threshold_on is the predetermined accelerator pedal operating speed threshold $S\omega$; abs(steer) is the absolute steer angle $\delta$; threshold_steer is the predetermined steer angle threshold $S\delta$; velocity is the measured longitudinal velocity $v_1$ of vehicle 1; and threshold_velocity is predetermined threshold $Sv_1$.

If conditions 1), 2) and 3) occur, observer block 11 determines cornering acceleration of vehicle 1, and generates trigger command CT.

If OFF when the above conditions occur, observer block 11 performs the following operations: changes the logic value of state variable tiro_state (tiro_state=1); assigns the measured accelerator pedal operating speed to variable throttle_init (throttle_init=throttle); assigns the relative measured value to longitudinal vehicle velocity variable velocity_hold, e.g. velocity_hold=velocity; assigns the relative measured value to vehicle steer angle variable steer_hold, e.g. steer_hold=steer; and assigns the relative measured value to the yaw rate variable yaw_rate_hold, e.g. yaw_rate_hold=yaw_rate.

If ON when conditions 1), 2), 3) occur, observer block 11 performs the following operations: changes the state variable logic value, e.g. tiro_state=0; and increases a count variable by one unit (count=count+1).

Observer block 11 is also configured to switch from ON to OFF when at least one of the following conditions occurs:

4) throttle<threshold_init
5) count*Ts>tiro_max_duration
6) abs(steer)<threshold_steer where Ts is the sampling time; threshold_init is a predetermined minimum accelerator pedal position threshold; and tiro_max_duration is the maximum function duration.

If ON when the above condition occurs, observer block 11 performs the following operations: changes the logic value of state variable tiro_state (tiro_state=0); assigns a zero value to variable throttle_init (throttle_init=0); assigns the measured value to longitudinal vehicle velocity variable velocity_hold (velocity_hold=velocity); assigns the measured value to vehicle steer angle variable steer_hold (steer_hold=steer); assigns the relative measured value to yaw rate variable yaw_rate_hold (yaw_rate_hold=yaw_rate); and zeroes the counter (count=0).

If OFF when at least one of conditions 4), 5), 6) occurs, observer block 11 remains OFF and performs the following operations: velocity_hold=velocity; steer_hold=steer; yaw_rate_hold=yaw_rate.

As regards reference generating block 13, it should be pointed out that the dynamic behaviour model represented by equation a) is based on two assumptions; firstly, that the vehicle is accelerating round a bend; and secondly, that the vehicle is stable with no roll.

If both are true, dynamic vehicle behaviour can be defined by understeering coefficient $K_{US}$ according to the equation:

$$\delta = \tau s \frac{L}{R} + Kus * ay \qquad \text{b)}$$

where ay is lateral acceleration, which can be calculated according to the equation:

$$ay = \frac{v_1^2}{R} = v1\dot{\Psi} \qquad \text{c)}$$

Substituting equation c) for ay in equation b) gives equation a) defining the mathematical model employed by reference generating block 13.

Figure 4:
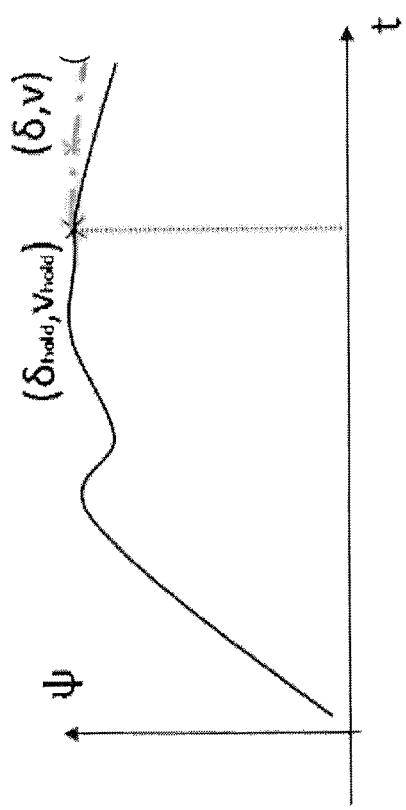
FIG. 4 shows an example time graph of the reference yaw rate determined by the FIG. 1 vehicle control system.

Since reference generating block 13 is only activated upon observer block 11 determining cornering acceleration, and since the ideal yaw rate does not exactly match the actual yaw rate prior to acceleration, using reference yaw rate $\dot{\psi}_{REF}$ as a set point for main controller 14 may result in discontinuity of the latter, which is perceptible by the driver during control (FIG. 4).

To eliminate this discontinuity and, hence, driver discomfort, in one embodiment, reference generating block 13 may be configured to implement an equation corresponding to a Taylor series of equation a), so as to linearize the reference yaw rate curve about the onset of acceleration (dash line in FIG. 4).

In connection with the above, it should be pointed out that vehicle handling enhancement system 10 provides for generating a continuous yaw rate reference by which to describe the dynamic behaviour of the vehicle in stable conditions. What in fact defines the dynamic behaviour of the vehicle is not the absolute yaw rate value, but the way in which the reference yaw rate is calculated alongside changes in acceleration and steer angle.

Since the reference yaw rate depends on the steer angle, the driver is therefore able to participate in control of the vehicle by the stability control system and so alter the dynamic behaviour of the vehicle. More specifically, if the driver steers the vehicle at a constant rate, the reference generating block does not interfere with control by stability control system 7.

Besides being cheap to implement, by employing the stability control system already on the vehicle, the vehicle control system described also has the advantage of allowing the driver to enhance vehicle performance to a greater degree with respect to known vehicle control systems.

Moreover, the vehicle control system may be variously adjusted, so the driver can choose the setting best suited to given driving conditions, and so obtain different performance levels of the same vehicle, depending on the chosen setting.

Clearly, changes may be made to the system described without, however, departing from the scope of the present invention as defined in the accompanying Claims.

The invention claimed is:

1. A system for controlling a vehicle comprising a number of wheels, and a brake assembly for exerting braking force on at least one wheel on the basis of a number of control parameters (Pi) selected from among wheel speed, steering wheel angle, accelerator pedal position, yaw rate, lateral acceleration, and longitudinal acceleration; said system comprising a vehicle stability control system configured to generate said control parameters (Pi) as a function of a control quantity (ΔP) associated with the intensity of the braking force to be exerted on at least one said wheel and comprising the sum of a pressure gradient $\Delta P_1$ generated by an open-loop control block, and a pressure gradient $\Delta P_2$ generated by a main controller;

said system comprising a vehicle handling enhancement system configured to:

determine the presence/absence of cornering acceleration of said vehicle as a function of longitudinal vehicle velocity ($v_1$), the steer angle (δ) of front wheels of the vehicle, and an operating speed (ω) of a vehicle accelerator pedal;

if a vehicle cornering acceleration is detected calculate, in the presence of said cornering acceleration of the vehicle, a reference vehicle yaw rate ($\dot{\psi}_{REF}$) by a Taylor series of the equation:

$$\dot{\psi}_{REF} = \delta \frac{v_1}{(\tau sL + K_{US}v_1^2)};$$

adjust said control quantity (ΔP) to zero the difference between the actual yaw rate ($\dot{\psi}$) and said reference vehicle yaw rate ($\dot{\psi}_{REF}$) where $K_{US}$ is an understeer coefficient; L is the vehicle wheelbase; τs the steering ratio; and $v_1$ is the longitudinal vehicle velocity.

2. A system as claimed in claim 1, wherein said vehicle handling enhancement system is configured to determine cornering acceleration of the vehicle when at least one of the following conditions occurs: the steer angle (δ) exceeds a predetermined steer threshold (Sδ); the operating speed (ω) of the vehicle accelerator pedal exceeds a predetermined pedal operating speed threshold (Sω); and longitudinal vehicle velocity ($v_1$) exceeds a predetermined velocity threshold ($Sv_1$).

3. A system as claimed in claim 1, wherein said vehicle handling enhancement system comprises a main controller which receives said difference between the actual yaw rate ($\dot{\psi}$) and said reference vehicle yaw rate ($\dot{\psi}_{REF}$), and supplies said control quantity (ΔP) on the basis of said difference; and an observer block which activates said main controller to generate said control quantity (ΔP) when said cornering acceleration of the vehicle is determined.

4. A system as claimed in claim 3, wherein said control quantity (ΔP) corresponds to a pressure gradient (ΔP); said main controller being configured to form, together with said stability control system, a closed control loop for regulating said pressure gradient (ΔP) to zero the difference between said reference vehicle yaw rate ($\dot{\psi}_{REF}$) and the actual yaw rate ($\dot{\psi}$).

* * * * *